D. Forrest.
Gas Meter.

No. 71,375. Patented Nov. 26, 1867.

Witnesses
Thos Insche
J. Alim Fraser

Inventor
David Forrest
Per Munn & Co
Attorneys

United States Patent Office.

DAVID FORREST, OF EASTPORT, MAINE, ASSIGNOR TO HIMSELF, P. M. KEANE, AND D. N. CLARK, OF THE SAME PLACE.

*Letters Patent No. 71,375, dated November 26, 1867.*

---

IMPROVEMENT IN GAS-METERS.

---

*The Schedule referred to in these Letters Patent and making part of the same.*

---

TO ALL WHOM IT MAY CONCERN:

Be it known that I, DAVID FORREST, of Eastport, in the county of Washington, and State of Maine, have invented a new and useful Improvement in Gas-Meters; and I do hereby declare that the following is a full, clear, and exact description thereof, which will enable others skilled in the art to make and use the same, reference being had to the accompanying drawings forming part of this specification.

This invention relates to a new and improved method of constructing gas-meters, whereby the quantity of gas which passes through the meter is accurately measured and recorded; and the invention consists in rotating a gas-wheel, containing chambers, by clock-work, which is moved by a spring, and in controlling the action of the said gas-wheel by the pressure of the gas upon elastic spring disks, as will be hereinafter described.

Similar letters of reference indicate corresponding parts.

Figure 1:
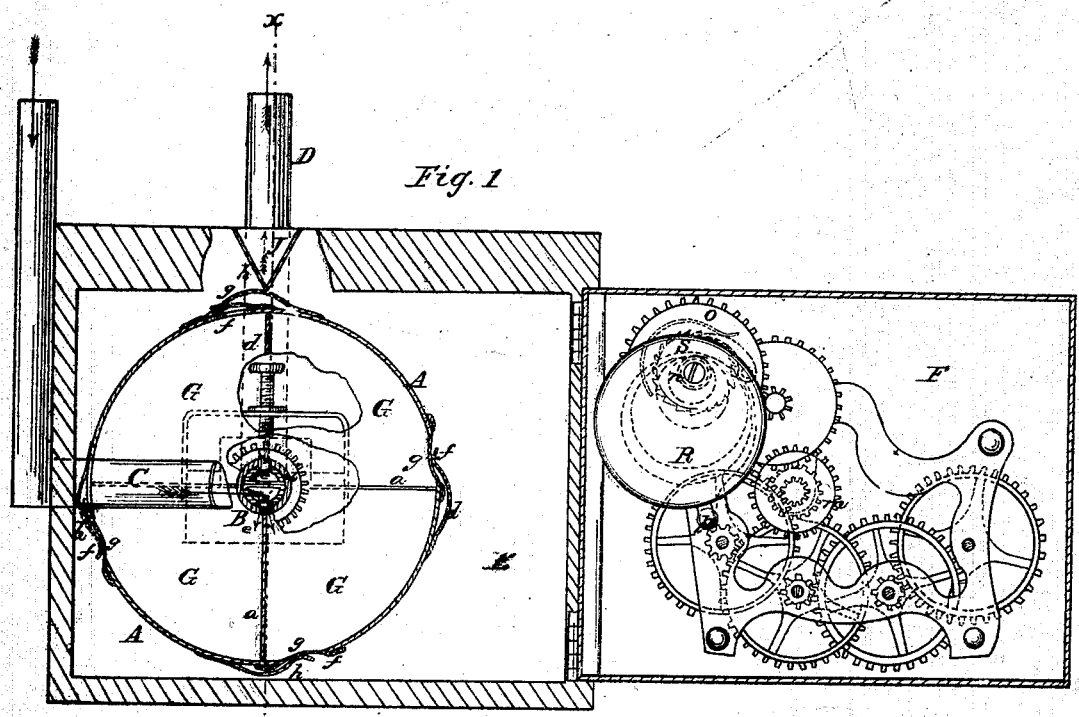
Figure 1 represents a vertical section of the meter taken through the line $y\,y$ of fig. 2, showing the same with the door and clock-work thrown back, and the chambered gas-wheel exposed.
Figure 2:
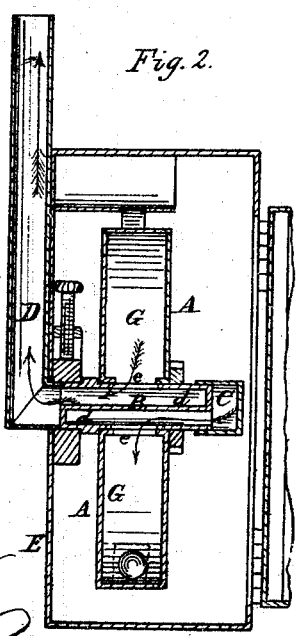
Figure 2 is a cross-section of fig. 1 through the line $x\,x$, showing the manner in which the gas is introduced into the wheel and discharged therefrom, and the springs by which the motion of the wheel is governed.

A represents the gas-wheel. B is the tube upon which the wheel revolves, the interior of which is in communication with the chamber of the wheel. C is the pipe through which the gas is introduced, which pipe is attached to one end of the tube B. D is the pipe through which the gas is discharged, and which is attached to the other end of the tube B. E represents the case or shell, within which the wheel revolves. F is the door to the case, to which is attached the clock-work which imparts motion to the wheel. The gas-wheel is divided into four compartments or chambers (which are marked G) by partitions $a$, which radiate from the centre or tube B. The tube B is divided into two parts by a longitudinal partition, as seen in the drawing at $d$. One part is connected at one end of the tube with the supply-pipe C, and the other part is connected at the other end of the tube with the discharge-pipe D. Both of these parts $d$, as well as each of the chambers G of the wheel, have apertures, through which the gas passes, as seen in the drawing at $e$. These apertures in the tube and wheel are narrow slits, and as the wheel revolves around the tube, and the apertures register or correspond with each other, gas is entering through one part of the tube and being discharged through the other, as seen by the arrows in the drawing.

The manner in which the gas-wheel is governed by the pressure of the gas (notwithstanding the action of the clock-work upon it) is as follows: Through the periphery of the wheel there is an orifice for each chamber, which orifice is covered (gas-tight) by an elastic disk, $g$. $h$ is a metallic spring, one end of which is attached to the wheel; the other end bears upon the elastic disk with a constant pressure. When one chamber of the wheel is filled with gas, its pressure will expand or force out the flexible disk and spring $g\,h$, and the revolving wheel will be stopped by the catch J, which is attached to the case. When in this position, the chamber which is under the spring which thus stops the wheel is in communication with the exhaust or discharge-pipe D, and the clock-work is stopped. If the gas is burning, the pressure will soon be relaxed by the discharge sufficiently to allow the wheel to start again, and turn until another full chamber is brought into the same position. While one chamber is being exhausted by the burner another chamber is being filled again, and the clock-work is allowed to revolve the wheel only when the pressure is removed by the consumption of the gas. When the gas is not burning, the gas-wheel will of course stand still. $i$ is a cog-wheel, which is attached to the side of the gas-wheel. When the door F, with the clock-work, is closed, this wheel engages with the wheel $m$ on the door, and motion is imparted to the gas-wheel thereby, when the pressure of the gas allows of such movement. The clock-work is actuated by a coil spring, which is attached to the arbor $n$ of the wheel $o$, and to a stud, $p$, on the frame of the clock-work. R is a disk, which secures the spring in place. To prevent back motion, there is a ratchet-wheel, S, on the arbor $n$, and a spring-pawl, $t$, on the wheel $o$, as seen in dotted lines through the disk R.

The arrangement of wheels for giving the proper motion to the index-fingers, or for registering the amount of gas consumed, does not necessarily differ from that in ordinary use. The gas is registered on the outside of the door, in figures numbering from (10) ten to ten thousand, (10,000,) in the usual manner. I use a spring, which can act on the registering-wheels only when the pressure of gas allows the gas-wheel to move. By this arrangement I overcome all back pressure in the flow of gas, so that none can escape except through the burner, whereas in the meters in common use the pressure of the gas must turn the wheels, thereby causing back pressure, and allowing the escape of more or less gas, which is unrecorded.

The clock-work in my meter is wound up with a key, the same as a time-piece, and it may be arranged to run a week or more. The meter is made of suitable size, and of proper materials in all its parts, and the working parts are adjusted and kept gas-tight by any suitable mechanical means.

Having thus described my invention, I claim as new, and desire to secure by Letters Patent—

1. The central tube B, and the gas-wheel A, constructed and arranged substantially as shown and described.

2. I claim the elastic disk $g$, and the spring $h$, on the periphery of the gas-wheel, and in combination therewith the catch J, substantially as and for the purpos set forth.

3. I claim revolving the gas-wheel A, and registering or recording the amount of gas consumed, by the action of a spring operating suitable gearing for that purpose, substantially as herein shown and described.

DAVID FORREST.

Witnesses:
R. B. CLARK,
J. F. MATHEWS.